United States Patent [19]

Mabry, deceased et al.

[11] E Re. 31,240

[45] Reissued May 17, 1983

[54] NEEDLEWORK TECHNIQUE USING RIBBON

[76] Inventors: Patricia D. Mabry, deceased, late of Birmingham, Ala.; by Henry C. Mabry, Jr., executor, 2700 Mountain Brook Pkwy., Birmingham, Ala. 35223

[21] Appl. No.: 125,762

[22] Filed: Feb. 28, 1980

Related U.S. Patent Documents

Reissue of:

[64] Patent No.: 4,075,962
Issued: Feb. 28, 1978
Appl. No.: 773,498
Filed: Mar. 2, 1977

[51] Int. Cl.[3] ..... D05C 17/00

[52] U.S. Cl. ..... 112/439; 112/266.1

[58] Field of Search ..... 112/266.1, 262.1, 439, 112/404, 429, 400, 401, 402, 416, 440; 28/1 R, 140, 149, 151, 152, 164; 139/413; 428/593

[56] References Cited

U.S. PATENT DOCUMENTS

| | | | |
|---|---|---|---|
| 190,501 | 5/1877 | LeRoux | 112/266.1 |
| 322,582 | 7/1885 | Cornely | 112/429 |
| 1,333,687 | 3/1920 | Strasburger | 112/404 |
| 1,581,936 | 4/1926 | Lehmann | 112/439 |
| 1,698,639 | 1/1929 | Lipper | 139/413 |
| 3,040,332 | 6/1962 | Kleinwald | 112/266.1 X |
| 3,660,215 | 5/1972 | Pawlicki | 428/593 |
| 3,899,620 | 8/1975 | Roeloffzen | 428/112 |

FOREIGN PATENT DOCUMENTS

| | | | |
|---|---|---|---|
| 391887 | 3/1924 | Fed. Rep. of Germany | 112/266.1 |
| 921760 | 1/1947 | France | 112/402 |
| 1550147 | 11/1968 | France | 112/439 |
| 180375 | 1/1936 | Switzerland | 112/402 |
| 187404 | 1/1937 | Switzerland | 112/439 |
| 235114 | 6/1925 | United Kingdom | 112/402 |

*Primary Examiner*—H. Hampton Hunter
*Attorney, Agent, or Firm*—Dann, Dorfman, Herrell and Skillman

[57] ABSTRACT

There is disclosed a technique analogous to needlepoint employing a ribbon and a needlework canvas. The ribbon is worked through the mesh openings of the canvas to lay a multiplicity of flat untwisted sections along perpendicular axes to completely cover the canvas between suitable margins.

24 Claims, 7 Drawing Figures

NEEDLEWORK TECHNIQUE USING RIBBON

Matter enclosed in heavy brackets [ ] appears in the original patent but forms no part of this reissue specification; matter printed in italics indicates the additions made by reissue.

BACKGROUND OF THE INVENTION

The technique of needle working yarn or thread onto a needlework canvas or linen is quite well developed and is the hobby or avocation of a large group of people. The most analogous conventional needlework stitches to this invention are known as a bargello stitch, a brick stitch, a basketweave stitch and a continental stitch. A description of a bargello stitch is found in Lee Wards, Complete Library of Needlecraft, Fuller & Dees, 1975, page 413. A description of brick, continental and basketweave stitches is found in Basic Needlecraft Stitches, Fuller & Dees, 1974, pages 24-27. In all of these stitches, the yarn exposed on the front of the needlework canvas is more-or-less aligned with the axis of the mesh openings rather than diagonal across the axis of the mesh openings. As is true in all of these type stitches, the yarn contains split threads on the back of the canvas resulting from passing the needle from the canvas front, piercing a yarn segment on the canvas back and drawing a length of yarn through the yarn segment on the back. Similarly, one characteristic of conventional needlepoint is that no concern is given to the orientation of the yarn on the canvas front because yarn is necessarily generally cylindrical or has no predominate axis transverse to the length of the yarn. As will become more fully apparent hereinafter, needleworking with ribbon requires that attention be given to the orientation of the ribbon sections appearing on the canvas front in order to provide a pleasing appearance. In addition, the splitting of ribbon on the canvas back is impermissible because any such deformation of the ribbon on the canvas back results in deformation of the ribbon segments visible on the canvas front thereby substantially detracting from the appearance of the finished piece.

SUMMARY OF THE INVENTION

It is an object of this invention to provide a technique for making a needleworked ribbon piece.

Another object of this invention is to provide a needleworked ribbon piece.

In summary, the needleworked ribbon piece is produced by threading a ribbon through the openings in a canvas mesh to leave flat untwisted ribbon sections exposed on the canvas front. The exposed ribbon sections run along perpendicular axes corresponding to the axes of the mesh openings in the needlework canvas. To create such a needlework piece, a ribbon is passed from the canvas back to the canvas front through an entry mesh opening, is drawn along one of the axes and is passed from the canvas front to the canvas back through an exit mesh opening which is separated from the entry opening by one or more intermediate openings. The ribbon is manipulated and tensioned to lay a flat untwisted ribbon section across the intermediate opening on the canvas front. This technique is repeated to lay a multiplicity of ribbon sections along the perpendicular mesh axes. When completed, the ribbon sections extend in the directions of both mesh axes and completely cover the front of the needlework canvas between suitable margins.

DETAILED DESCRIPTION OF THE PREFERRED EMBODIMENTS

Figure 1:
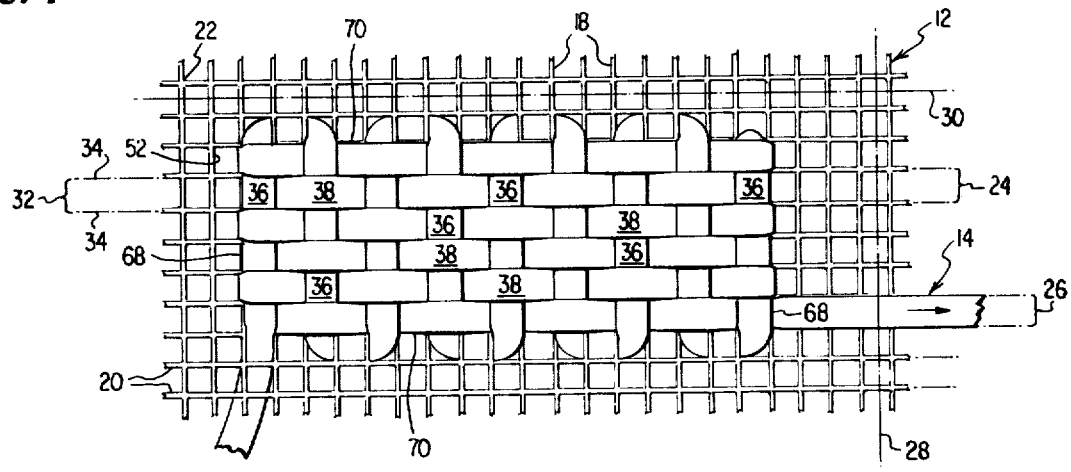
FIG. 1 is a view of the front of a completed needlework piece in accordance with the principles of this invention.
Figure 2:
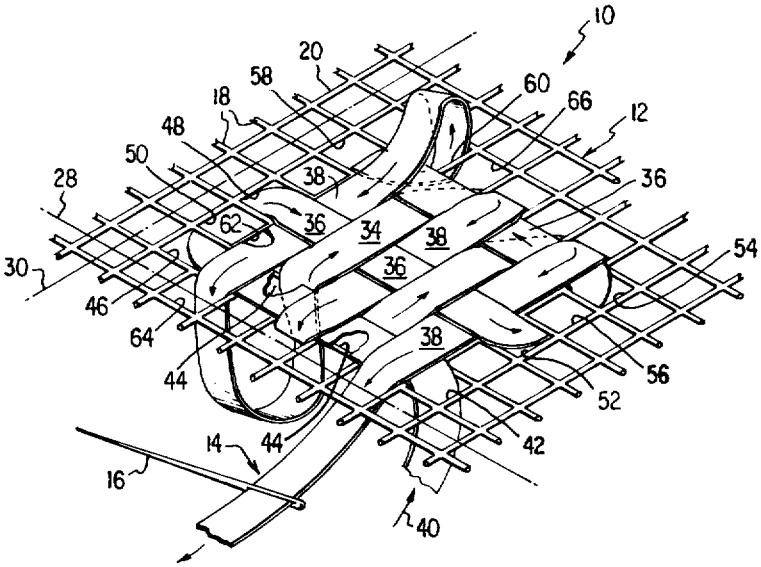
FIG. 2 is an isometric view illustrating the path of the ribbon when conducting the stitch illustrated in FIG. 1.

Referring to FIGS. 1 and 2, a needlework piece 10 comprises a needlework canvas 12 and a ribbon 14 threaded through the openings of the canvas 12 by the use of a needle 16 as will be explained more fully hereinafter. As used herein, the term needlework canvas is intended to encompass any mesh fabric, such as linen, suitable for needlework.

The needlework canvas 12 is of generally conventional design comprising a multiplicity of generally perpendicular relatively stiff strands 18, 20 of any suitable material joined at the intersections 22 thereof in any suitable manner. The strands 18, 20 define a multiplicity of generally identical substantially square openings in the canvas 12 which have a length 24 no longer than the width 26 of the ribbon 14. In relatively large mesh canvas, for example where the openings are less than about 0.1 inches on a side, the openings tend to have rounded corners and are consequently only substantially square. In any event, the term substantially square is intended to include the opening formed by a multiplicity of generally perpendicular strands. As will be more fully pointed out hereinafter, the ribbon width 26 may be in the range of 1-3 times the opening length 24 and is preferably in the range of 1.1-2.2 times the opening length 24. The sides of the mesh openings extend along generally perpendicular x and y mesh axes 30, 28.

As will be more fully apparent hereinafter, the ribbon is selected to be of such a width when, in the completed condition of the needlework piece 10, the ribbon covers the strands 18, 20 making up the canvas 12. Accordingly, it may be more appropriate to consider that the ribbon width is at least as great as the distance 32 between the center lines 34 of adjacent strands 18, 20. As will be more fully apparent hereinafter, particularly in connection with FIGS. 6 and 7, the ribbon width 26 may be somewhat greater than the distance 32 between adjacent center lines 34. It accordingly appears that the ribbon width 26 should be in the range of 1-1.7 times the center line distance 32 and is preferably in the range of 1-1.4 times the center line distance 32.

As is apparent from the completed needlework piece 10 illustrated in FIG. 1, the ribbon 14 comprises a plurality of flat untwisted first ribbon sections 36 on the front of the canvas 12 extending in the direction of the y axis 28. In the completed needlework piece 10, the ribbon 14 also comprises a multiplicity of flat untwisted second sections 38 on the front of the canvas 12 and extending in the direction of the x axis 30. In the stitch of FIGS. 1 and 2, the first and second ribbon sections 36, 38 span a substantial distance across the canvas 12 and are merely interwoven rather than extended through the canvas 12 inside the margins of the piece 10.

Referring to FIG. 2, the stitch of FIG. 1 is illustrated on a somewhat different scale although like reference characters are used to designate like elements. The laying down of the first ribbon section 36 is accomplished by threading the ribbon 14 through the canvas 12 in the direction illustrated by the arrows beginning with the arrow 40. The ribbon 14 is passed from the back of the canvas 12 through an initial entry opening 42 and spans a number of intermediate openings 44 before passing from the canvas front to the canvas back through an exit opening 46. The ribbon 14 is pulled tight and is then twisted on the canvas back and enters on the front of the canvas 12 through an entry opening 48 spaced from the exit opening 46 by a medial opening 50. The ribbon 14 then spans a number of intermediate openings and exits from the front of the canvas 12 through an exit opening 52. The ribbon 14 is again twisted on the back side of the canvas 12 and passes to the front thereof through an entry opening 54 spaced from the exit opening 52 by a medial opening 56. It is seen that the exit opening 52, the medial opening 56 and the entry opening 54 together define an axis aligned with the x axis 30. The ribbon 14 then spans a number of intermediate openings before passing through an exit opening 58 to the canvas back. This technique is repeated as often as desired to create as long a pattern of first ribbon sections 36 as desired. In addition, the resultant weave illustrated in FIG. 1 may be substantially tighter by eliminating the medial openings 50, 56 so that the first ribbon sections 36 lie along adjacent rows of mesh openings.

To create the second ribbon sections 38, the ribbon 14 is twisted on the back of the canvas 12 after passing through the final exit opening 58 and passed to the canvas front through an initial entry opening 60. The ribbon 14 is then passed parallel to the x axis 30 alternately overlying and underlying the first ribbon sections 36 on the front of the canvas 12 and spans a number of intermediate openings 62 before passing through an exit opening 64 to the back of the canvas 12. On the canvas back, the ribbon 14 is twisted and passed through one of the intermediate openings 44 which, in this circumstance, is also an entry opening. After passing through the opening 44, the ribbon 14 passes alternately over and under the first ribbon sections 36 and passes from the front of the canvas 12 through an exit opening 66. This technique is repeated for as long as desired to create a sufficient number of second ribbon sections 38 to completely cover the canvas 12 between y axis margins 68 and x axis margins 70.

The ends of the ribbon 14 are conveniently tied off on the back of the canvas 12 in any suitable fashion. For example, at one end of the ribbon, it may be tied to the canvas 12 prior to threading the ribbon 14 through the mesh fabric and the other end tied off when the free portion of the ribbon 14 becomes too short to continue threading.

Because the ribbon 14 does not pass through the canvas 12 except at the ends of the rows of the first and second ribbon sections 36, 38, it is evident that the pattern illustrated in FIGS. 1 and 2 is relatively quick and simple to do but has the disadvantage that the body of ribbon is not attached to the canvas 12 except at the periphery of the needlework done thereon.

Several features should be evident from the stitch of FIGS. 1 and 2 which differentiate this invention from conventional needlepoint. First, the first and second ribbon sections 36, 38 are flat and untwisted on the front of the canvas 12. Second, the ribbon 14 is nowhere split, which is here used to mean that the ribbon 14 never passes through itself. Third, the ribbon sections 36, 38 extend in the direction of the y and x axes 30, 28, respectively.

*Stated in a slightly different fashion, the equally-spaced strands 18 of the needlework canvas lying along the x axis and the equally-spaced strands 20 lying along the y axis define a multiplicity of mesh openings of generally identical substantially square configuration. The ribbon sections 36 and 38 completely cover the canvas front within the margins of the needlework ribbon piece on the canvas. One side of each "y-axis" ribbon section 36 overlies and conceals a "y-axis" canvas strand 18, and each of the other two sides of each y-axis ribbon section 36 overlies and conceals an x-axis strand 20 which defines the entry or exit opening at the end of the ribbon section. In this fashion, the canvas front is completely covered between the margins of the needleworked piece which are defined by the exit and entry openings. Referring to the first y-axis ribbon section 36 in FIG. 2 which extends from the opening 42 to the opening 46, its longitudinal sides overlie the second and third y-axis strands of the canvas in FIG. 2 (the third and fourth y-axis strands of the canvas in FIG. 1)*, and the transverse sides of the ribbon section overlie the third and eighth x-*axis strands in FIG. 2 (the third and ninth in FIG. 1) which define the entry and exit openings 42 and 46, respectively. In a similar fashion, the final x-axis ribbon section 38 in FIG. 2 has its longitudinal sides overlying the third and fourth x-axis strands of the canvas and its transverse sides overlying respectively the second and seventh y-axis strand. In this embodiment of the invention, the x-axis and y-axis ribbon sections are interwoven over the top surface of the canvas with the sides of the ribbon sections superimposed as shown. The transverse sides of each of the y-axis ribbon sections 36 either overlie or underlie the longitudinal sides of the first and last x-axis ribbon sections 38, and the longitudinal sides of each of the y-axis ribbon sections 36 underlie the transverse sides of alternate x-axis ribbon sections 38 on one side and overlie the transverse sides of the intermediate x-axis ribbon sections 38 on the other side.*

Figure 4:
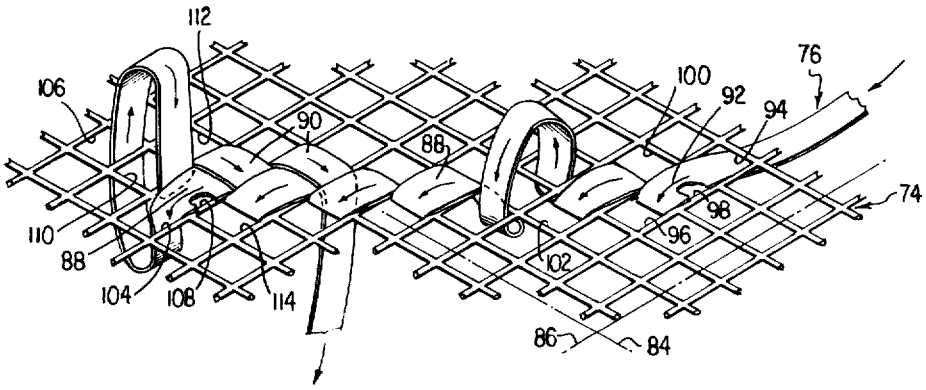
FIG. 4 is an isometric view illustrating the path of the ribbon when creating the needlework piece of FIG. 3.
Figure 3:
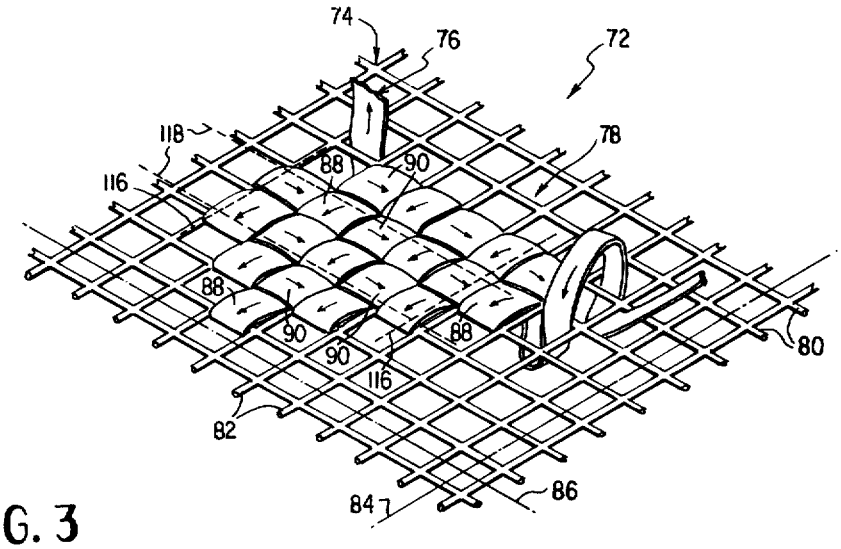
FIG. 3 is an isometric view illustrating the front of a needlework piece employing a somewhat different stitch.
Figure 5:
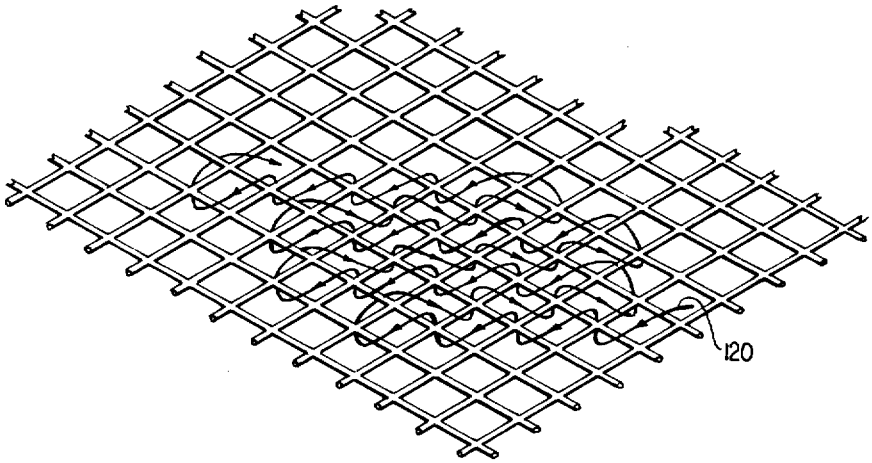
FIG. 5 is a schematic view illustrating the ribbon path of the stitch of FIGS. 3 and 4 in a greater areal extent.

Referring to FIGS. 3–5, another stitch is illustrated in a completed needlework piece 72 comprising a needlework canvas 74 as will be more fully explained hereinafter.

The needlework canvas 74 is substantially identical to the canvas 12 and comprises a multiplicity of generally perpendicular relatively stiff strands 80, 82 defining a multiplicity of generally identical substantially square mesh openings. The sides of the openings extend along generally perpendicular x and y axes 84, 86.

As is apparent from the completed needlework piece 72 in FIG. 3, the ribbon 76 comprises a plurality of flat untwisted first ribbon sections 88 on the front of the canvas 74 extending in the direction of the x axis 84. The ribbon 76 in the completed piece 72 also comprises a plurality of flat untwisted second ribbon sections 90 extending in the direction of the y axis 86. As will become more fully apparent, the adjacent ribbon sections act to cover the area of entry to the front of the canvas 74 and act to cover the area of exit from the canvas front. Accordingly, the resultant pattern on the front of the piece 72 appears to be continuous. In addition, the ribbon 76 is connected to the canvas 74 at many locations within the periphery of the completed piece 72.

As illustrated in somewhat different scale in FIGS. 4 and 5, the laying down of the first ribbon sections 88 is accomplished by threading the ribbon 76 through the canvas 74 in the direction illustrated by the arrows beginning with the arrow 92. The ribbon 74 accordingly passes onto the front of the canvas 74 through an entrance opening 94 and passes to the canvas back through an exit opening 96 spaced from the entrance opening 94 by a single intermediate opening 98. After passing to the back of the canvas 74, the ribbon 76 is twisted to pass to the canvas front 74 through an entry opening 100, spans an intermediate opening and then passes to the canvas back through an exit opening 102. This technique is repeated to lay down a plurality of the first ribbon sections 88 on a diagonal with each of the ribbon sections extending in the direction of the y axis 86. At the end of the diagonal, the ribbon 14 passes through an exit opening 104 to the canvas back and is then twisted and passed through an entrance opening 106 offset from the exit opening 104. The ribbon 76 is then passed into an exit opening 108 spaced from the entrance opening 106 by a single intermediate opening 110. The ribbon 76 is then twisted and passed through an entrance opening 112 to the canvas front, extended across an intermediate opening and then passed through an exit opening to the canvas back. The second ribbon sections 90 are accordingly laid down on a diagonal with each individual section 90 extending in the direction of the x axis 84.

It is evident that the terminology of entry opening, intermediate opening and exit opening is somewhat confusing as is apparent upon consideration of the opening 108. Relative to the first ribbon section 88, the opening 108 is an intermediate opening. Relative to the second ribbon section 90 that spans the intermediate opening 110, the opening 108 is an exit opening. Relative to a ribbon section that spans the opening 114, the opening 108 is an entry opening. In any event, it will be evident that any opening in the canvas 74 which is spaced from the periphery of the laid down ribbon 76 may be an entry opening, an exit opening and an intermediate opening. *Inspection of FIGS. 3–5 reveals that between the margins of the needleworked piece, each entry and exit opening for an x-axis ribbon section is an intermediate opening for a y-axis ribbon section, and conversely, each entry and exit opening for a y-axis ribbon section is an intermediate opening for an x-axis ribbon section.* Accordingly, the ribbon section which overlies each *intermediate* opening acts to conceal the [entrance] *entry* and exit areas thereof because the width of the ribbon is at least as great as the length of the opening sides. Consequently, the canvas 74 is completely covered between x axis margins 116 and y axis margins 118.

*The x-axis and y-axis ribbon sections of FIG. 3 each extend over a single intermediate opening, the longitudinal sides of each x-axis ribbon section overlying the x-axis strands defining the intermediate opening and the transverse sides of each x-axis ribbon section overlying the y-axis strands defining the intermediate opening. The diagonal arrangement of the sections juxtaposes the longitudinal sides of each x-axis ribbon section with the transverse sides of a different y-axis section and vice versa. In this fashion, the x-axis ribbon sections are exposed alternately with the y-axis ribbon sections in each transverse and longitudinal row of mesh openings. Furthermore, interiorly of the margins of the piece, each ribbon section is juxtaposed by four ribbon sections extending in the direction of the other axis, and, in the embodiment of FIG. 3, is wholly bordered by such sections.*

In FIG. 5 there is schematically illustrated a ribbon path 120 corresponding to a modestly sized section of completed needleworking by the stitch of FIGS. 3 and 4.

Figure 6:
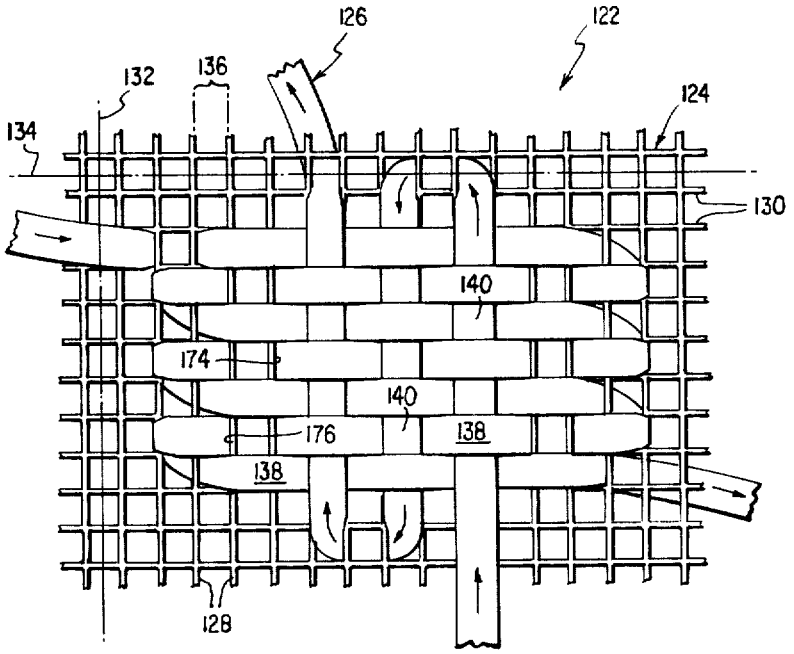
FIG. 6 is a view of the front of another needlework piece illustrating another stitch.
Figure 7:
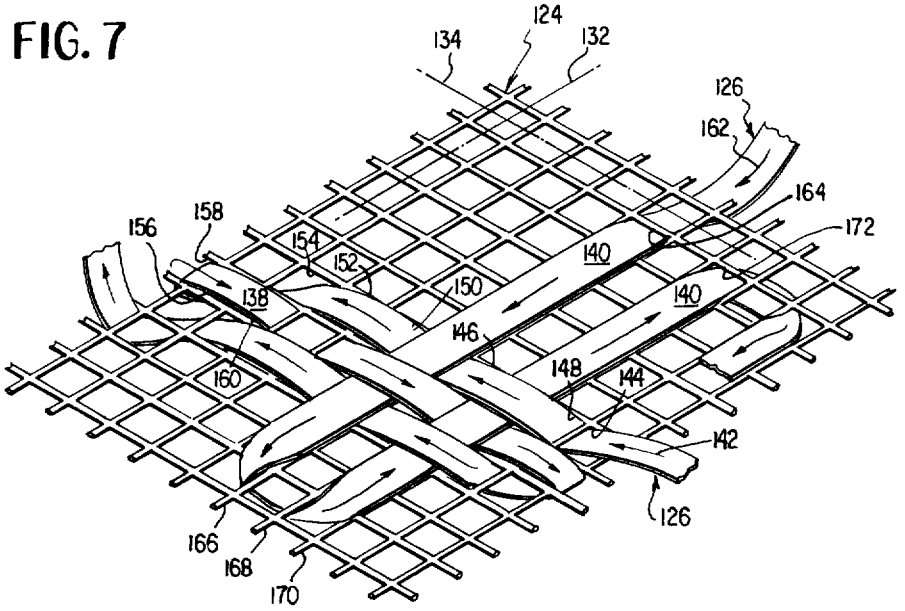
FIG. 7 is an isometric view illustrating the ribbon path when creating the stitch of FIG. 6.

Referring to FIGS. 6 and 7, another stitch is illustrated in a completed needlework piece 122 comprising a needlework canvas 124 and a ribbon 126 worked through the openings in the canvas 124 as will be more fully explained hereinafter.

The needlework canvas 124 may be substantially identical to the canvas 12 and comprises a multiplicity of generally perpendicular relatively stiff strands 128, 130 defining a multiplicity of generally identical substantially square mesh openings. The sides of the openings extend along generally perpendicular x and y axes 134, 132. Although the illustration of FIG. 6 appears to be substantially the same size as the illustrations of FIGS. 1 and 3, a sample made of the embodiment of FIG. 3 utilized a canvas having a centerline distance of 0.3 inches and a ribbon width of 0.3 inches. In the sample according to FIG. 6, the centerline distance between adjacent strands 128, 130 was about 0.1 inches while the ribbon width was on the order of 0.125 inches.

The stitch of FIG. 6 differs in two respects from the stitch of FIG. 1. First, the ribbon 126 is somewhat wider than the length 136 of the side of the openings. In addition, the ribbon 126 in the completed needlework piece 122 is connected to the canvas 124 at a number of locations inside the margins of the completed piece 122.

As is apparent from the completed needlework piece 122 in FIG. 6, the ribbon 126 comprises a plurality of flat untwisted first ribbon sections 138 on the canvas front extending in the direction of the x axis 134. The adjacent ribbon sections act to cover the area of entry of the ribbon 126 to the front of the canvas 124 and act to cover the area of exit from the canvas from at least away from the edge of the completed piece 122. Accordingly, the result of the pattern on the front of the piece 122 appears to be continuous. In addition, the ribbon 126 is connected to the canvas 124 at many locations within the periphery of the completed piece 122.

Although it is believed easier to lay down the ribbon sections 138 first, it is evident that the sections 140 may be laid down first if desired. As illustrated in FIG. 7, the laying down of the first ribbon sections 138 is accomplished by threading the ribbon 126 through the canvas 124 in the direction illustrated by the arrows beginning with the arrow 142. The ribbon 126 accordingly passes onto the front of the canvas 124 through an entrance opening 148 and passes to the canvas back through an exit opening 146 spaced from the entrance opening 148 by a single intermediate opening. After passing along the back of the canvas 124 across a single intermediate opening, the ribbon 126 extends through an entrance opening 150, spans an intermediate opening 152 and passes to the canvas back through an exit opening 154. This technique of spanning a single intermediate opening on the front of the canvas 124 and then a single intermediate opening on the back side is repeated until the ribbon approaches the desired margin of the completed piece 122. After exiting from the canvas front at the last exit opening, for example opening 154, the ribbon 126 extends along the canvas back and is twisted diagonally across a medial opening 156 and passes onto the front of the canvas 124 through an entry opening 158 wherein the openings 156, 158 reside in a row of openings parallel to the openings 152, 154 and are immediately adjacent thereto. Ribbon 126 then spans the front side of the intermediate opening 156 and passes from the front side of the canvas 124 through an opening 160. The technique of spanning an intermediate opening on the canvas front and then spanning an intermediate opening on the canvas back is repeated with the first ribbon sections 138 in adjacent rows being diagonally related. This technique is repeated as desired to lay down a multiplicity of the first ribbon sections 138 with each of the ribbon sections extending in the direction of the x axis 134.

The laying down of the second ribbon sections 140 is accomplished by threading the ribbon 126 through the canvas 124 along the y axis 132 in the direction indicated by the arrows beginning with the arrow 162. The ribbon 126 passes onto the front of the canvas 124 through an entry opening 164. The ribbon 126 is then passed parallel to the y axis 132 immediately above the plane of the canvas 124 thereby underlying all of the first ribbon sections 138. It will accordingly be apparent that a major distinction between the stitches of FIGS. 1 and 6 is that, in FIG. 1, the second ribbon sections 38 alternately overlie and underlie the first ribbon sections 36 and each row of ribbon sections 36 resides on the front side of the canvas 12. In the stitch of FIGS. 6 and 7, a ribbon segment residing parallel to the x axis 134 is alternately on the front side of the canvas 124 and on the back side thereof.

Another major distinction between the stitches of FIGS. 1 and 6 is that the stitch of FIG. 6 incorporates curling of the ribbon 126 as it passes downwardly through an exit opening, such as the opening 174, and curling of the ribbon 126 as it passes through an entrance opening, such as the opening 176. This is caused, of course, because the width of the ribbon 126 is somewhat larger than the length of the mesh opening sides of the canvas 124. Even though the edges of the ribbon sections 138 are curled, they are considered flat and untwisted because the sections 138 are flat and untwisted immediately above the ribbon segment providing the sections 140. In addition, the axis of the sections 138 is untwisted.

I claim:

1. A method of making a needleworked ribbon piece on a needlework canvas having a front, a back and a multiplicity of equally spaced interconnected strands lying along perpendicular x and y axes and defining a multiplicity of mesh openings, comprising first steps for laying up a multiplicity of first flat untwisted ribbon sections on the front of said canvas extending in the direction of the x axis;

second steps for laying up a multiplicity of second flat untwisted ribbon sections on the front of the canvas extending in the direction of the y axis for completely covering the canvas front between margins of the piece;

the steps including juxtaposing, inside the margins, four sides of each first section to a side of a different second section, juxtaposing, inside the margins, four sides of each second ribbon section to a side of a different first section; and securing the ribbon ends to the piece.

2. The method of claim 1 wherein the first steps comprise repeatedly passing a ribbon end through first mesh openings to the canvas front then to the canvas back through second mesh openings spaced from the first mesh openings along the x axis by at least one intermediate x axis mesh opening;

repeatedly manipulating the ribbon to lay the first flat untwisted sections across the intermediate x axis openings in the direction of the x axis; and tensioning the first sections.

3. The method of claim 2 wherein the second steps comprise repeatedly passing a ribbon end through third mesh openings to the canvas front then to the canvas back through fourth mesh openings spaced from the third mesh openings along the y axis by at least one intermediate y axis opening;

repeatedly manipulating the ribbon to lay the second flat untwisted sections across the intermediate y axis mesh openings in the direction of the y axis; and tensioning the second sections.

4. The method of claim 3 wherein the step of repeatedly passing the ribbon end across the intermediate x axis mesh openings comprises repeatedly passing the ribbon end through the first mesh openings to the canvas front then to the canvas back through second mesh openings spaced from the first mesh openings along the x axis by a single intermediate x axis mesh opening.

5. The method of claim 4 wherein the step of repeatedly passing the ribbon end across the intermediate y axis mesh openings comprises repeatedly passing the ribbon end through the third mesh openings to the canvas front then to the canvas back through fourth mesh openings spaced from the third mesh openings along the y axis by a single intermediate y axis mesh opening.

6. The method of claim 3 wherein the step of repeatedly passing the ribbon end across the intermediate x axis mesh openings comprises passing the ribbon end through the first mesh opening to the canvas front then to the canvas back through the second mesh opening spaced from the first mesh opening along the x axis by a single intermediate x axis mesh opening, and twisting the ribbon on the back of the canvas and passing the ribbon end through a first mesh opening adjacent the last mentioned intermediate x axis opening and spaced therefrom along the y axis to the canvas front then to the canvas back through a second mesh opening spaced from the first mesh opening along the x axis by a single intermediate x axis opening.

7. The method of claim 3 wherein the step of repeatedly passing the ribbon end across the intermediate x axis mesh openings comprises passing the ribbon end through the first mesh opening to the canvas front then to the canvas back through the second mesh opening spaced from the first mesh opening by a single intermediate x axis mesh opening, and then passing the ribbon end through a first mesh opening adjacent the last mentioned second mesh opening and spaced therefrom along the x axis to the canvas front through a second mesh opening spaced from the first mesh opening along the x axis by a single intermediate x axis opening.

8. The method of claim 3 wherein the step of repeatedly passing the ribbon end across the intermediate x axis mesh openings comprises repeatedly passing the ribbon end through the first mesh openings to the canvas front then to the canvas back through second mesh openings spaced from the first mesh openings along the x axis by a multiplicity of intermediate x axis mesh openings.

9. The method of claim 8 wherein the step of repeatedly passing the ribbon end across the intermediate y axis mesh openings comprises repeatedly passing the ribbon end through the third mesh openings to the canvas front then to the canvas back through fourth mesh openings spaced from the third mesh openings along the y axis by a multiplicity of intermediate x axis mesh openings, including alternately passing the ribbon end over and under the first ribbon sections.

10. A needlework piece comprising a needlework canvas having a multiplicity of perpendicular strands defining generally identical mesh openings, the strands extending along perpendicular x and y axes and being small relative to the openings; and a ribbon having a width between 1–2 times the distance between the centers of adjacent parallel strands;

the ribbon extending through a multiplicity of first mesh entry openings to a multiplicity of front surface positions on the canvas, then to a multiplicity of back surface positions on the canvas through a multiplicity of second mesh exit openings, each first mesh opening being spaced from the second mesh opening by at least one intermediate mesh opening, the first, intermediate and second openings being parallel to one of the axes;

the ribbon extending through a multiplicity of third mesh entry openings to a multiplicity of front surface positions on the canvas, then to a multiplicity of back surface positions on the canvas through a multiplicity of fourth mesh exit openings, each third mesh opening being spaced from the fourth mesh openings by at least one intermediate mesh opening, the third, intermediate and fourth openings being parallel to the other of the axes;

the ribbon providing a multiplicity of first and second flat untwisted ribbon sections across the intermediate mesh openings on the front surface of the canvas;

the first and second ribbon sections being alternately exposed on the canvas front;

the first and second ribbon sections extending in the directions of the x and y axes respectively and completely covering the canvas front between margins of the piece; and each ribbon section spaced interiorly of the margins extending in the direction of one axis and being juxtaposed by four ribbon sections extending in the direction of the other axis.

11. The needlework piece of claim 10 wherein the ribbon repeatedly extends from the front surface of the canvas to the rear surface thereof within the margins of the piece.

12. The needlework piece of claim 10 wherein the entrance and exit openings of at least some of the first ribbon sections are at least partially covered by adjacent second ribbon sections.

13. The needlework piece of claim 10 wherein each ribbon section spaced interiorly of the margins extending in the direction of one axis being wholly [boarded] *bordered* by four ribbon sections extending in the direction of the other axis.

14. The needlework piece of claim 10 wherein the first and second mesh openings are spaced apart by a multiplicity of intermediate openings.

15. The needlepoint piece of claim 14 wherein the third and fourth mesh opening are spaced apart by a multiplicity of intermediate openings.

16. The needlepoint piece of claim 14 wherein the third and fourth mesh openings are spaced apart by a single intermediate opening.

17. The needlepoint piece of claim 10 wherein the first and second mesh openings are spaced apart by a single intermediate opening.

18. The needlepoint piece of claim 10 wherein the third and fourth mesh openings are spaced apart by a single intermediate opening.

*19. A method of making a needleworked ribbon piece on a needlework canvas having a front, a back and a multiplicity of interconnected strands lying along perpendicular x and y axes and defining a multiplicity of mesh openings, comprising*

*first steps for laying up a multiplicity of first flat untwisted ribbon sections on the front of said canvas extending in the direction of the x axes;*

*second steps for laying up a multiplicity of second flat untwisted ribbon sections on the front of the canvas extending in the direction of the y axes; and*

*third steps including securing the ribbon ends to the piece;*

*each said first step comprising the passing a ribbon end from the back to the front of said canvas through an x-axis entry mesh opening between pair of adjacent x-axis strands, passing the ribbon end on the front of said canvas across at least one intermediate x-axis opening between said pair of adjacent x-axis strands, and passing the ribbon end from the front to the back of said canvas through an x-axis exit opening between said pair of adjacent x-axis strands beyond said x-axis intermediate opening to provide an untwisted x-axis ribbon section extending between said x-axis entry and exit openings,*

*each said second step comprising the passing a ribbon end from the back to the front of said canvas through an y-axis entry mesh opening between pair of adjacent y-axis strands, passing the ribbon end on the front of said canvas across at least one intermediate y-axis opening between said pair of adjacent y-axis strands, and passing the ribbon end from the front to the back of said canvas through an y-axis exit opening between said pair of adjacent y-axis strands beyond said y-axis intermediate opening to provide an untwisted y-axis ribbon section extending between said y-axis entry and exit openings,*

*at least some of said x-axis entry and exit openings being y-axis intermediate openings, and at least some of said y-axis entry and exit openings being x-axis intermediate openings, whereby said untwisted x-axis ribbon sections conceal the underlying y-axis entry and exit*

*openings, and said untwisted y-axis ribbon sections conceal the underlying x-axis entry and exit openings.*

*20. A method according to claim 19 wherein at least selected x-axis and y-axis ribbon sections extend through the same length, the intermediate and the exit openings for one ribbon section of a given type being alongside respectively the entry and the intermediate openings for the adjacent ribbon section of the same type on one side, and the entry and an intermediate opening for said one ribbon section being alongside respectively the intermediate and exit openings for the adjacent ribbon section of the same type on the other side, whereby said ribbon sections of each type are disposed in diagonal rows with respect to the x and y axes of the canvas.*

*21. A method according to claim 20 wherein each of said selected ribbon sections is passed across a single intermediate opening between its entry and exit openings.*

*22. A method according to claim 21 wherein said selected y-axis ribbon sections in one diagonal row utilize as y-axis entry openings the x-axis intermediate openings for the selected x-axis ribbon sections in a diagonal row adjacent thereto.*

*23. A method according to claim 21 wherein said selected x-axis ribbon sections in one diagonal row utilize as x-axis entry openings the y-axis intermediate openings for the selected y-axis ribbon sections in a diagonal row adjacent thereto.*

*24. A needlework piece comprising*

*a needlework canvas having a multiplicity of perpendicular strands defining mesh openings, the strands extending along perpendicular x and y axes and being small relative to the openings; and*

*a ribbon having a width between 1–2 times the distance between the centers of adjacent parallel strands;*

*the ribbon extending through a multiplicity of first mesh entry openings to a multiplicity of front surface positions on the canvas, then to a multiplicity of back surface positions on the canvas through a multiplicity of second mesh exit openings, each first mesh opening being spaced from its associated second mesh opening along the x-axis by at least one intermediate mesh opening, the first, intermediate and second openings being aligned with the x-axes;*

*the ribbon extending through a multiplicity of third mesh entry openings to a multiplicity of front surface positions on the canvas, then to a multiplicity of back surface positions on the canvas through a multiplicity of fourth mesh exit openings, each third mesh opening being spaced from its associated fourth mesh opening along the y-axis by at least one intermediate mesh opening, the third, intermediate and fourth openings being aligned with the y-axes; and*

*the ribbon providing a multiplicity of x-axis and y-axis flat untwisted ribbon sections across the intermediate mesh openings on the front surface of the canvas;*

*said first and second mesh openings for the x-axis sections constituting intermediate openings for the y-axis sections, and said third and fourth mesh openings for the y-axis sections constituting intermediate openings for the x-axis sections.*

* * * * *